(No Model.)
J. T. GALLAGHER.
COMBINED RASP AND FILE.
No. 349,490. Patented Sept. 21, 1886.
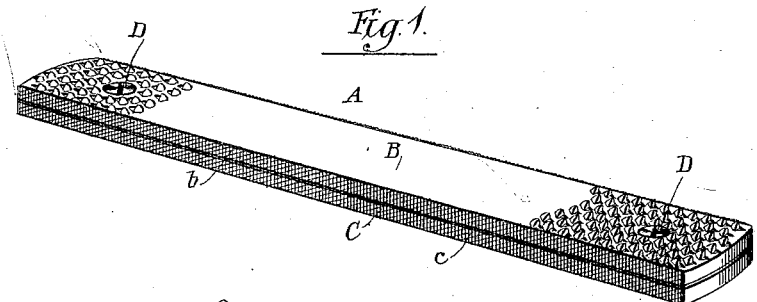
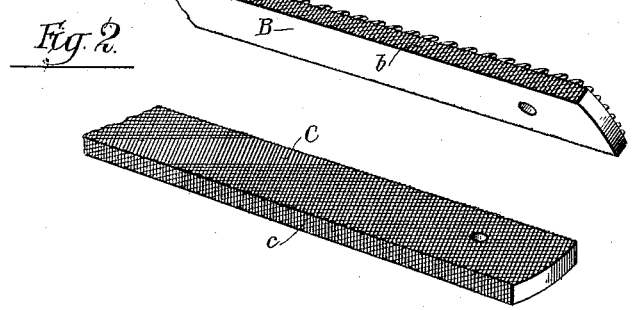
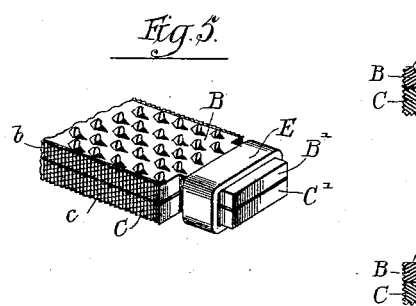
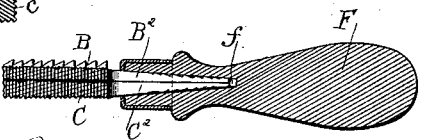
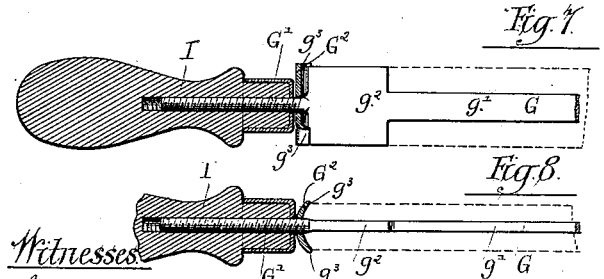
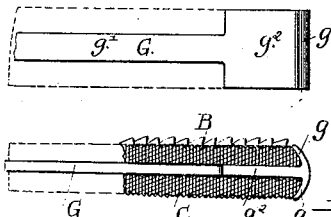
Witnesses
Louis W. Whitehead
C. C. Poole
Inventor:
John T. Gallagher
by M. E. Dayton
Attorney
N. PETERS, Photo-Lithographer, Washington, D. C.

UNITED STATES PATENT OFFICE.

JOHN T. GALLAGHER, OF CHICAGO, ILLINOIS, ASSIGNOR OF ONE-HALF TO DAVID J. KENNEDY, OF SAME PLACE.

COMBINED RASP AND FILE.

SPECIFICATION forming part of Letters Patent No. 349,490, dated September 21, 1886.

Application filed April 10, 1886. Serial No. 198,422. (No model.)

*To all whom it may concern:*

Be it known that I, JOHN T. GALLAGHER, of Chicago, in the county of Cook and State of Illinois, have invented certain new and useful Improvements in Combined Rasps and Files; and I do hereby declare that the following is a full, clear, and exact description thereof, reference being had to the accompanying drawings, and to the letters of reference marked thereon, which form a part of this specification.

This invention relates to a cutting or abrading implement—such as is used by blacksmiths and horseshoers—in which are combined a file and rasp, or which is provided upon one side with chisel-cut teeth similar to those of an ordinary file, and which has upon its opposite side separate protruding teeth, formed by the indentations of a pointed punch, and intended and adapted for cutting softer substances than those upon which the file-cut side of the article is used.

In rasps or files of the character above described it has been found difficult in the process of manufacture to so temper the article that the chisel-cut side will be sufficiently hard for the purposes for which it is intended without making the protruding teeth of the rasp side too brittle to be lasting, it obviously being unnecessary and undesirable to make the rasp side of great hardness, owing to the softer nature of the substances on which it is used, and the desirability of making the teeth tough to prevent them from readily breaking. It is found, furthermore, in the use of an implement of the character above described, as usually made and tempered, that either the chisel-cut side or the rasp-cut side is liable to become worn out very much sooner than the other side, depending upon the way the implement is used and the kind of work or material to which the said implement is applied, so that the implement is frequently rendered useless and thrown away while the one or the other side thereof is still in condition for use.

The object of this invention is to provide a combined rasp and file which shall be without the objectionable features above pointed out. To this end an implement embodying my invention is made of two separate pieces or bars of metal secured together with their flat faces in contact, one of said pieces being made or finished upon its working face or faces with rasp-teeth and the other piece with chisel-cut teeth. By this construction the part or bar having the rasp-teeth may be made and tempered to the exact degree of hardness found most desirable for rasps, and the other or file-cut bar may be similarly tempered, as found most desirable for files, each part or side of the implement thus being given the temper most favorable to its successful operation and durability. The implement thus made has the advantage, also, that either of the two parts may be replaced as soon as worn to such an extent as to be useless, so that the other side or part may be used until entirely worn out, with obvious advantages in point of economy.

As far as the general features of the invention above pointed out are concerned, the two parts or bars composing the article may be secured together in any desired or preferred manner, several different devices for this purpose being herein shown.

In carrying my invention into practice either or both of said parts or bars composing the implement may be cut or finished with working-faces upon both sides, instead of upon one side only, so that after one working side of a part or bar thus made with two working-faces becomes worn out the said part or bar may be reversed, and the inner and unworn working-face thereby brought into position for use.

The invention may be more readily understood by reference to the accompanying drawings, in which—

Figure 1 is a perspective view of a two-part implement forming a file and rasp constructed in accordance with my invention. Fig. 2 is a fragmentary perspective view illustrating the two parts or bars composing the implement separated from each other. Fig. 3 is a transverse sectional view of the implement shown in Fig. 1, taken through one of the screws therein shown as employed to fasten the two parts of the said implement together. Fig. 4 is a transverse sectional view of a form of the implement in which the faces of the two parts or bars which come in contact with each other are smooth or uncut, and in which a rivet is used to secure said two parts to each other. Fig. 5 is a fragmentary perspective of the end portion of a two-part implement, showing a ring or band as employed to fasten the parts thereof together. Fig. 6 is a sectional view of the end portions of a file provided with tangs or projections entering a handle, which operates to hold the two parts of the implement together at its end adjacent to said handle. Fig. 7 illustrates in side view, and Fig. 8 in longitudinal section, a clamp or holder adapted to secure in proper relative position the two parts or bars of the implement, and at the same time afford a handle whereby it may be conveniently used.

As illustrated in the said drawings, A indicates the implement as a whole, said implement consisting of a rasp-cut part or bar, B, and a similarly-shaped part or bar, C, which is file-cut, or in which the teeth are cut with a chisel.

In the particular form of the device shown in Figs. 1, 2, and 3 the two parts or bars B and C are secured together by headed screws D, passing through countersunk apertures in one of said parts and engaging screw-threaded holes in one of the other parts. As shown in said Figs. 1, 2, and 3, also, the bar B is rasp-cut upon one face and smooth upon its opposite or inner face, as clearly shown in Figs. 2 and 3, and the file-cut part C, on the contrary, is provided with teeth upon both faces, so that after one side or face becomes worn it may be turned to bring the opposite unworn face outwardly, with advantages in increasing the durability of the implement above pointed out.

The side edges, $b$ $c$, of both of the parts B and C are shown in the drawings as provided with chisel-cut teeth, as is common in finishing files; but the edges may obviously be made in any other way, as may be found convenient or desirable for the particular kind of work for which the implement is intended.

In the sectional view, Fig. 4, is illustrated a form of my improved implement in which the parts or bars B and C are each provided with working-faces upon one side only, and in which the surfaces coming together are smooth or flat. In this case a rivet, D', is illustrated as being employed to secure the parts B and C together.

Instead of using screws or rivets in the main portion or body of the implement for connecting the parts B and C, devices engaging the ends of the said parts or engaging projections formed upon the said ends may obviously be employed. A construction of this kind is shown in Fig. 5, in which the bars B and C are provided upon their extreme ends with rectangular projections or prolongations B' C', over which is fitted a metal band, E, made to snugly fit the projections, so that it may be driven firmly in place with a hammer, and may be removed in a similar manner.

The implement, when unprovided with a handle, may have projections B' and C' and a band similar to that shown in Fig. 5 at both ends, the projections and bands obviously in such case forming convenient parts for grasping the implement. In case it is desired to provide the file or rasp with a handle at one end, however, the parts of the implement may be conveniently connected at their ends adjacent to the said handle by providing each part or bar with a tang, and inserting the tangs together into the handle. A construction of this kind is shown in Fig. 6, in which a handle, F, is shown as provided with an aperture, $f$, adapted to receive tangs $B^2$ $C^2$ upon the parts or bars B and C. It is entirely obvious in this connection that when the handle F is employed in the manner shown in Fig. 6 either one of the devices above referred to or any other means adapted for the purpose may be employed for securing together the ends of the parts or bars which are remote from the handle.

In the device for holding the two parts B and C of a two-part file or rasp, (shown in Figs. 7 and 8,) G indicates a flat metal bar provided at one end with two laterally-projecting flanges, $g$, having inwardly-inclined or oblique inner faces. The opposite end of said bar is provided with a screw-threaded shank, G', adapted to enter a threaded aperture in a handle, I, of familiar construction. Upon the shank G', between the handle and the main part of the bar, is placed a plate, $G^2$, centrally apertured for the passage of the said shank, and provided with parts $g^3$ $g^3$ at each side of the bar, having inclined faces arranged opposite the inclined faces of the projections $g$ $g$ at the opposite end of the device. The parts or projections $g$ $g$ and $g^3$ $g^3$, provided with inclined faces, as above set forth, are arranged to engage correspondingly inclined or beveled end faces upon the parts or bars B and C, as clearly shown in the drawings, the parts being adapted for the convenient removal and insertion of said parts or bars by turning the handle I upon the shank G', so as to force the plate $G^2$ toward or release it from the adjacent ends of the bars, as desired. In the particular construction in the device herein shown the bar G is made narrower than the width of the parts or bars B and C at its middle part, $g'$, and widened at its end portions, $g^2$, so as to afford suitable support to the end portions of the said parts or bars.

The holding device above described obviously affords a simple and convenient means of connecting the two parts of an implement made as hereinbefore set forth, while at the same time supplying a handle for conveniently manipulating the implement, and said holder is therefore herein specifically claimed as part of my invention.

It is to be understood that the main feature of my invention is embodied in an implement of the character above stated, which is made of or with two connected parts or bars, one of which is provided with rasp-teeth and the other with file-teeth, and my invention, broadly considered, is not therefore limited to either of the particular forms of attaching devices herein shown.

I claim as my invention—

1. A combined rasp and file consisting of two connected parts, one of which is provided with rasp-teeth and the other with file-teeth, substantially as described.

2. A combined rasp and file consisting of two connected parts, one of which is provided with rasp-teeth and the other with file or chisel-cut teeth, and means for detachably connecting said parts or bars, substantially as described.

3. A combined rasp and file consisting of two connected parts or bars, one of said parts or bars being provided with rasp-teeth upon one side or face and being made smooth upon the other side or face, and the other of said parts or bars being provided with file or chisel-cut teeth upon both faces, substantially as described.

4. The combination, with two parts, A and B, of a rasp or file, of a holding device consisting of a bar, G, provided with projections $g\ g$ at one end and a threaded shank at its opposite end, a plate, $G^2$, and a handle, I, said projections $g\ g$ and the plate $G^2$ being constructed to engage the ends of the said parts A and B, substantially as described.

5. A combined rasp and file consisting of two connected parts, one of which is made of rasp-steel and provided with rasp-teeth, and the other of which is made of harder or file steel and provided with chisel-cut teeth, substantially as described.

In testimony that I claim the foregoing as my invention I affix my signature in presence of two witnesses.

JOHN T. GALLAGHER.

Witnesses:
C. CLARENCE POOLE,
DAVID J. KENNEDY.